(12) United States Patent
Wilburn

(10) Patent No.: US 7,507,276 B1
(45) Date of Patent: Mar. 24, 2009

(54) GAS TREATMENT SYSTEM

(76) Inventor: Daniel L. Wilburn, 11530 S. Lowe, Chicago, IL (US) 60628

( * ) Notice: Subject to any disclaimer, the term of this patent is extended or adjusted under 35 U.S.C. 154(b) by 444 days.

(21) Appl. No.: 11/355,578

(22) Filed: Feb. 15, 2006

(51) Int. Cl.
*B01D 53/02* (2006.01)

(52) U.S. Cl. .......................... 96/108; 96/125

(58) Field of Classification Search .................. 96/108, 96/125; 55/DIG. 30; 110/203, 210, 342, 110/345
See application file for complete search history.

(56) References Cited

U.S. PATENT DOCUMENTS 4,058,147 A * 11/1977 Stary et al. .................... 141/45
5,169,414 A * 12/1992 Panzica et al. ................. 95/113
5,440,873 A * 8/1995 Toda et al. ................. 60/39.12
5,538,539 A * 7/1996 Spokoyny et al. ............... 96/52
6,199,492 B1 * 3/2001 Kunstler ...................... 110/342
2001/0009124 A1* 7/2001 Suzuki et al. .................. 95/113
2005/0109207 A1* 5/2005 Olander et al. ................. 95/141

* cited by examiner

Primary Examiner—Frank M Lawrence

(57) ABSTRACT

A gas treatment system is disclosed. In an illustrative embodiment, the gas treatment system includes a vacuum header; a vacuum system connected to the vacuum header; a scrubber system having at least one chemical filtration element connected to the vacuum system; and a furnace system connected to the scrubber system.

18 Claims, 4 Drawing Sheets

GAS TREATMENT SYSTEM

FIELD

The present invention relates generally to gas treatment systems. More particularly, the present invention relates to a gas treatment system which can be attached to a boiler system to treat chemicals in air or gases released from an industrial source.

BACKGROUND

Various industrial processes generate air or gases having chemicals which are harmful to the environment if not treated or removed from the gases before release of the gases into the environment. Therefore, the Environmental Protection Agency (EPA) has formulated requirements for the treatment of gases released from industrial sources prior to release of the gases into the environment. These requirements must be implemented to ensure air quality.

SUMMARY

The present invention is generally directed to a gas treatment system. In an illustrative embodiment, the gas treatment system includes a vacuum header; a vacuum system connected to the vacuum header; a scrubber system having at least one chemical filtration element connected to the vacuum system; and a furnace system connected to the scrubber system.

BRIEF DESCRIPTION OF THE DRAWINGS

The invention will now be described, by way of example, with reference to the accompanying drawings, in which.

DETAILED DESCRIPTION

Figure 1:
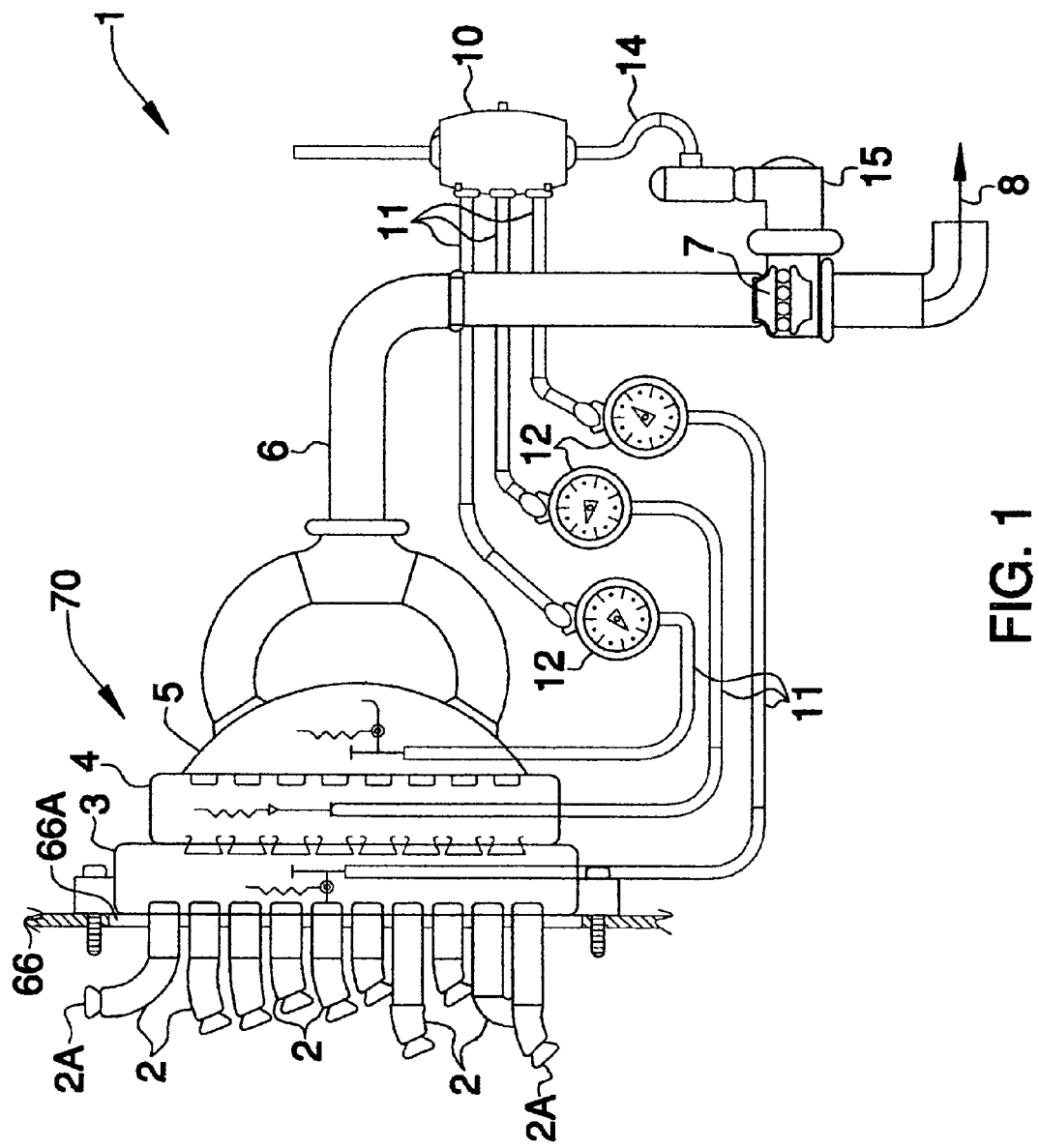
FIG. 1 illustrates a vacuum header component of an illustrative embodiment of a gas treatment system according to the present invention.

Referring to the drawings, an illustrative embodiment of a gas treatment system is generally indicated by reference numeral 1 in FIG. 1. The gas treatment system 1 is suitable for removing chemicals from gases 8 generated during any of a variety of industrial processes before the gases are released into the environment. As shown in FIG. 1, the untreated gases initially flow through a flue stack 66 in an industrial plant (not shown). Briefly, the gas treatment system 1 includes a vacuum header 70 (FIG. 1) which is connected to the flue stack 66 and receives and initially filters and burns chemicals in the gases 8; a vacuum system 71 (FIG. 2) which generates vacuum pressure that draws the gases 8 through the gas treatment system 1; a scrubber system 72 (FIG. 3) which additionally filters chemicals and combusted chemical by-products from the gases 8; and a furnace system 73 by which the gases are subjected to an additional vacuum step prior to being released to the environment. The vacuum header 70, vacuum system 71, scrubber system 72 and furnace system 73 may be configured to be detachably mounted in any type of industrial system which requires the emission of air or gases containing harmful chemicals.

As shown in FIG. 1, the vacuum header 70 typically includes multiple intake nozzles 2 which extend through an opening 66a provided in the wall of the flue stack 66. Each of the intake nozzles 2 may include a nozzle tip 2a having a reverse-tapered configuration. A vacuum chamber 3 communicates with the intake nozzles 2, a vacuum chamber 4 communicates with the vacuum chamber 3 and a vacuum chamber 5 communicates with the vacuum chamber 4. A electronic junction box 10 is connected to the vacuum chambers 3, 4 and 5 through respective electronic diagnostic lines 11. Pressure gauges 12 may be provided in the respective electronic diagnostic lines 11 to indicate the pressure of a fuel gas (not shown) as it flows from the fuel box 10 to the vacuum chambers 3, 4 and 5 through the respective electronic diagnostic lines 11. A vacuum chamber outlet 6 extends from the vacuum chamber 5. A control valve 7 may be provided in the vacuum chamber outlet 6. A burner 15 may be fitted to the vacuum chamber outlet 6, typically at the control valve 7. The electronic motor 15 is connected to the electronic junction box 10 through a electronic control line line 14.

Figure 2:
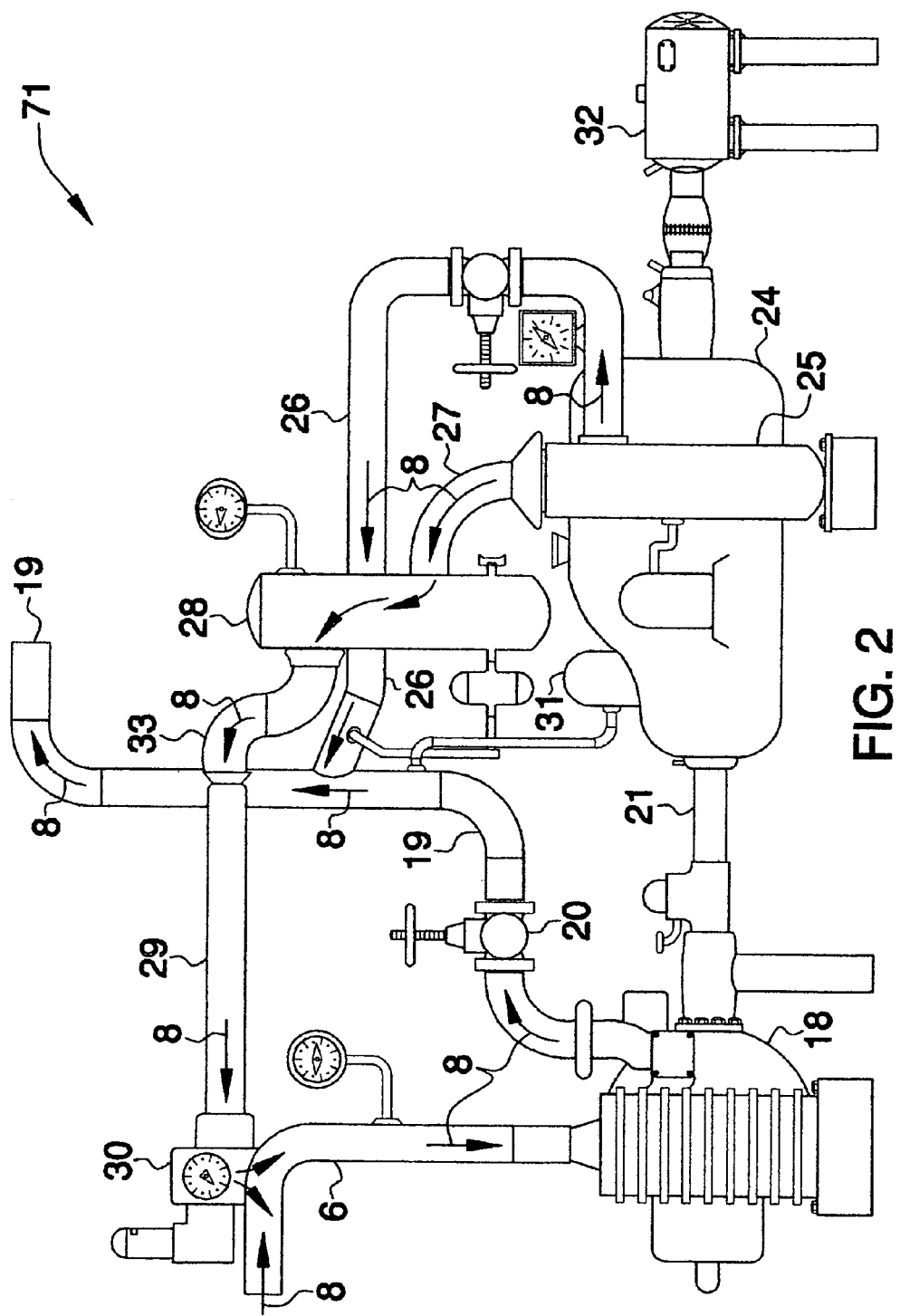
FIG. 2 illustrates a vacuum system component of an illustrative embodiment of a gas treatment system according to the present invention.

As shown in FIG. 2, the vacuum chamber outlet 6 of the vacuum header 70 is connected to the vacuum system 71. The vacuum system 71 typically includes a vacuum pump 18 which is connected to the vacuum chamber outlet 6. A vacuum outlet 19, which may be fitted with a valve 20, extends from the vacuum pump 18. An auxiliary vacuum pump 24 may be connected to the vacuum pump 18 through a connecting conduit 21. The vacuum pump 18 and auxiliary vacuum pump 24 may be operated by a common pump motor 32. A manifold 25 is connected to the outlet of the auxiliary vacuum pump 24. A main outlet 26 and an auxiliary outlet 27 extend from the manifold 25. The main outlet 26 leads into the vacuum outlet 19. The auxiliary outlet 27 is connected to a chamber 28. A bypass conduit 29 extends from the chamber 28 and bypasses the vacuum outlet 19. A vacuum booster 33 may be provided in the bypass conduit 29, between the chamber 28 and the power line vacuum booster 30. A power line vacuum breaker 30 may be provided in the bypass conduit 29 and is disposed in fluid communication with the vacuum chamber outlet 6 to break or attenuate vacuum pressure in the vacuum chamber outlet 6, as needed. A vacuum breaker 31 may also be connected to the vacuum outlet 19.

The vacuum outlet 19 of the vacuum system 71 is connected to the scrubber system 72. The scrubber system 72 typically includes a holding tank 36 which is connected to the vacuum outlet 19 of the vacuum system 71. At least one holding tank outlet 37, connected to a gas filtration tank 40, extends from the holding tank 36. Typically, a pair of holding tank outlets 37 extends from the holding tank 36 and a pair of gas filtration tanks 40 is connected to the pair of holding tank outlets 37, respectively. A control valve 38, which may be an automatic control valve, for example, may be provided in each holding tank outlet 37, between each holding tank 36 and corresponding gas filtration tank 40. At least one chemical filtration element 41 is provided in each gas filtration tank 40. Typically multiple, such as three, chemical filtration elements 41 are provided in each gas filtration tank 40. Each of the chemical filtration elements 41 may be, for example, a screen-based chemical filtration element known to those skilled in the art. Each of the chemical filtration units 41 in each gas filtration tank 40 is adapted to receive a stream of the gas 8 from the corresponding holding tank outlet 37. The chemical filtration units 41 are mounted for rotation in each gas filtration tank 40 by a motor 42. A filtration tank outlet 44 extends from each gas filtration tank 40 and is connected to a junction box 47. An access hatch (not shown) may be provided in each filtration tank outlet 44 to facilitate access to the interior of each gas filtration tank 40. The discharge ends of the holding tank outlets 37 are connected to the junction box 47 through a return line 46. A return pump 45 is provided in the return line 46 to pump the unfiltered gas 8 through the return line 46. An atomizer 50 may be connected to the junction box 47. A bleed air line 51 may connect the holding tank 36 to the atomizer 50 to introduce bleed air (not shown) from the vacuum pump 18 into the atomizer 50 and atomize the filtered gas 8 in the atomizer 50, as will be hereinafter described. An atomizer outlet 52 extends from the atomizer 50.

Figure 4:
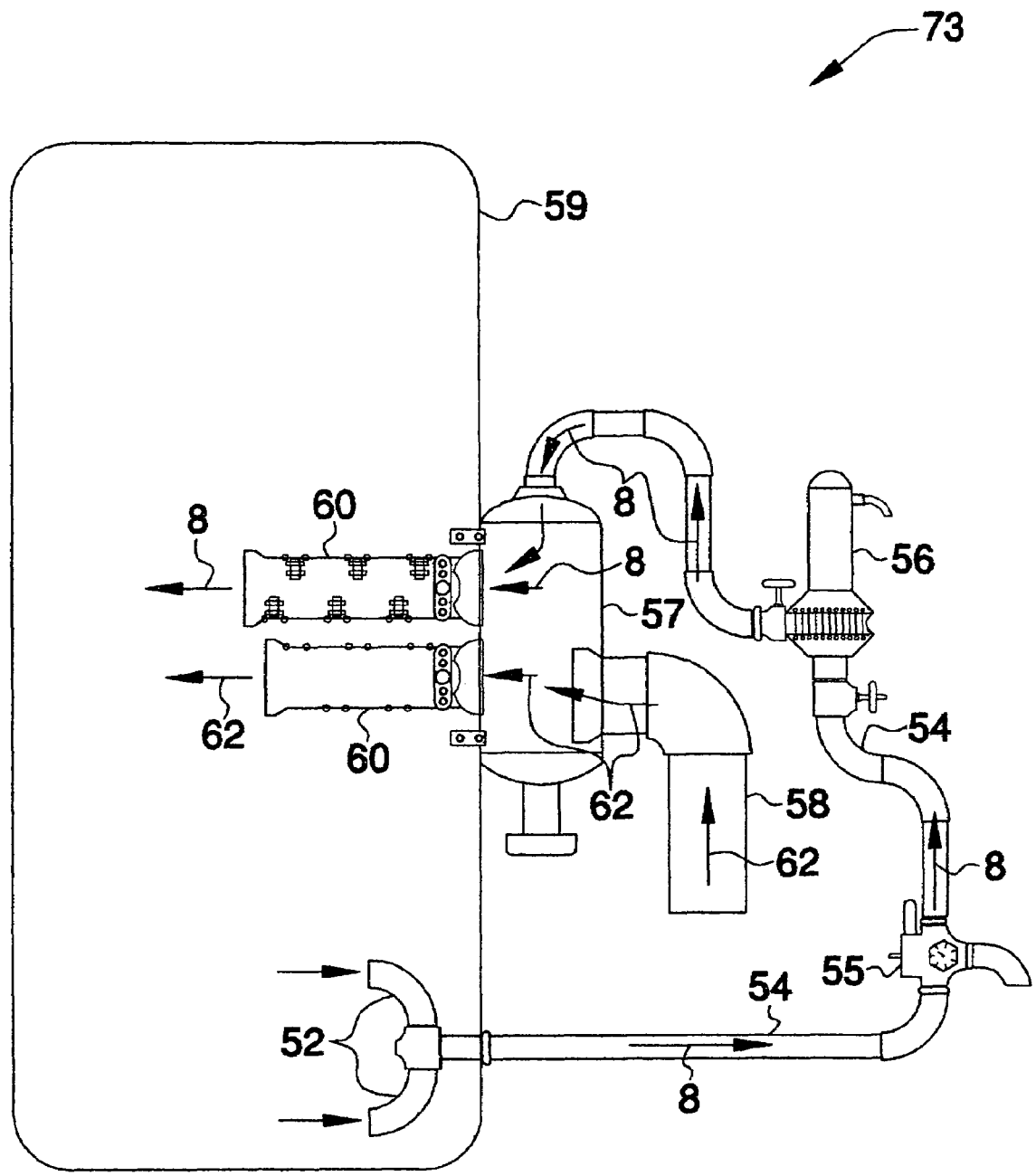
FIG. 4 illustrates a furnace system component of an illustrative embodiment of a gas treatment system according to the present invention.

The atomizer outlet 52 of the scrubber system 72 is connected to the vacuum air inlet 58 of the furnace system 73. As shown in FIG. 4, the furnace system 73 typically includes a recycle line 54 which is connected to the bottom inside of furnace system 73. A control valve 55, which may be an automatic control valve, for example, may be provided in the recycle line 54. A booster pump motor 56 is provided in the recycle line 54, and a chemical destroyer feeder 57 is connected to the booster pump motor 56. An vacuum air inlet 58 is connected to the chemical destroyer feeder 57. A furnace 59, which may be a boiler furnace, for example, is connected to the chemical destroyer feeder 57. At least one chemical nozzle 60 extends from the booster pump 57 and into the furnace 59. A discharge outlet (not shown) extends from the furnace 59.

In typical use, the gas treatment system 1 removes chemicals, including environmentally-harmful chemicals, from gases 8 which are generated during an industrial process. The gases 8 typically flow through the flue stack 66 and are drawn into the vacuum header 70 due to vacuum pressure generated by the vacuum pump 18 of the vacuum system 71 (FIG. 2). Accordingly, the gases 8 enter the vacuum header 70 through the intake nozzles 2. The gases 8 flow through the vacuum chambers 3, 4 and 5, respectively, before leaving the vacuum header 70 through the combustion chamber outlet 6. In the combustion chambers 3, 4 and 5, the gases 8 are heated to a temperature of typically about 800~1,000 degrees Celsius. Therefore, many of the chemicals in the gases 8 are burned before the gases 8 leave the vacuum header 70 through the combustion chamber outlet 6. Furthermore, many of the chemicals are filtered from the gases 8 in the combustion chambers 3, 4 and 5. The gases 8 may be subjected to an additional combustion step by the burner 15 prior to leaving the vacuum header 70. The pressure gauges 12 in the fuel lines 11 indicate the pressure of fuel as it flows from the fuel box 10 to the respective combustion chambers 3, 4 and 5.

Figure 3:
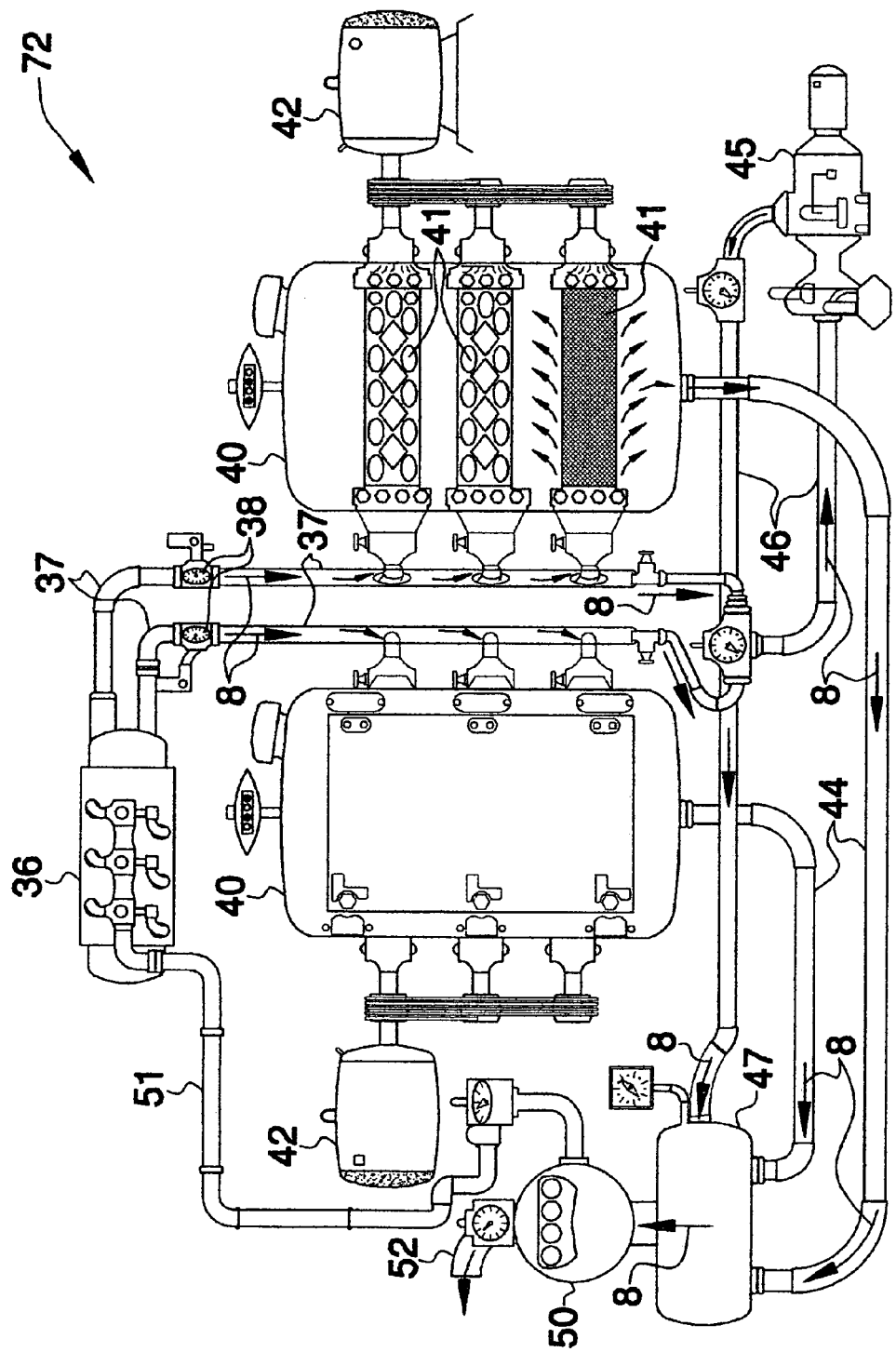
FIG. 3 illustrates a scrubber system component of an illustrative embodiment of a gas treatment system according to the present invention.

As shown in FIG. 2, as they leave the vacuum header 70, the gases 8 enter the vacuum system 71. A first portion of the gases 8 flows through the vacuum pump 18 and the vacuum outlet 19 to the scrubber system 72 (FIG. 3). A second portion of the gases 8 flows to the auxiliary vacuum pump 24 through the connecting conduit 21 and from the auxiliary vacuum pump 24 through the manifold 25, auxiliary outlet 27, chamber 28, bypass conduit 29 and to power line vacuum breaker 30, respectively. When it is necessary to attenuate or break the vacuum pressure in the combustion chamber outlet 6, the power line vacuum breaker 30 may be operated to introduce some of the gases 8 from the bypass conduit 29 and into the combustion chamber outlet 6. Some of the second portion of the gases 8 flows from the manifold 25, through the main outlet 26 and back into the vacuum outlet 19.

The gases 8 flow from the vacuum outlet 19 and into the holding tank 36 (FIG. 3) of the scrubber system 72. The gases 8 flow from the holding tank 36 through the holding tank outlets 37. The control valves 38 may be adjusted to regulate the flow rate of the gases 8 through the respective holding tank outlets 37. From the holding tank outlets 37, the gases 8 flow into the respective gas filtration tanks 40. More particularly, the gases 8 flow through the respective chemical filtration elements 41 in each gas filtration tank 40. Simultaneously, the chemical filtration elements 41 in the gas filtration tanks 40 may be rotated by operation of the respective motors 42. Therefore, the chemical filtration elements 41 remove many of the gases and gas combustion products from the gases 8.

The filtered gases 8 leave each gas filtration tank 40 through a filtration tank outlet 44. The filtration tank outlets 44 distribute the filtered gases 8 to the junction box 47. The portion of the gases 8 which bypasses the gas filtration tanks 40 by remaining in the holding tank outlets 37 is pumped by the return pump 45 to the junction box 47 through the return line 46. The filtered gases 8, as well as the small portion of unfiltered gases 8, is distributed from the junction box 47, through the atomizer 50 and discharged to the furnace system 73 (FIG. 4) through the atomizer outlet 52.

Bleed air (not shown) from the vacuum pump 18 is distributed from the holding tank 36, through the bleed air line 51 and to the atomizer 50, where the bleed air is introduced into the atomizer 50 through air nozzles (not shown). The bleed air atomizes the gases 8 as the gases 8 pass through the atomizer 50.

The atomized gases 8 flow from the atomizer outlet 52 of the scrubber system 72 to the pump inlet line 54 (FIG. 4) of the furnace system 73. The automatic control valve 55 may be set to control the rate of flow of the gases 8 through the pump inlet line 54. The booster pump motor 56 operates the booster pump 57, which pumps the gases 8 from the pump inlet line 54 and into the boiler furnace 59 through the respective chemical nozzles 60. Air 62 is drawn into the chemical destroyer feeder 57 through the vacuum air inlet 58 and enters the boiler furnace 59 with the gases 8 through the chemical nozzles 60. In the boiler furnace 59, the gases 8 are heated to a temperature of typically about 800~1000 degrees Fahrenheit prior to being released to the atmosphere through a suitable outlet (not shown) that is connected to the boiler furnace 59. Therefore, the boiler furnace 59 burns any harmful chemicals which remain in the gases 8 as they enter the furnace system 73. Consequently, the gases 8 which are released from the boiler furnace 59 to the atmosphere are completely or substantially devoid of chemicals which are harmful to the environment.

While the preferred embodiments of the invention have been described above, it will be recognized and understood that various modifications can be made in the invention and the appended claims are intended to cover all such modifications which may fall within the spirit and scope of the invention.

What is claimed is:

1. A gas treatment system, comprising:
   a vacuum header; said vacuum header comprises a plurality of intake nozzles and at least one combustion chamber communicating with said plurality of intake nozzles
   a vacuum system connected to said vacuum header;
   a scrubber system having at least one chemical filtration element connected to said vacuum system; and
   a furnace system connected to said scrubber system.

2. The gas treatment system of claim 1 further comprising a fuel box and at least one fuel line connecting said fuel box to said at least one combustion chamber.

3. The gas treatment system of claim 2 further comprising at least one pressure gauge provided in said at least one fuel line.

4. The gas treatment system of claim 2 further comprising a combustion chamber outlet communicating with said at least one combustion chamber and a burner provided in said combustion chamber outlet and connected to said fuel box.

5. The gas treatment system of claim 4 further comprising a control valve provided in said combustion chamber outlet.

6. The gas treatment system of claim 1 further comprising a plurality of tapered nozzle tips provided on said plurality of intake nozzles, respectively.

7. A gas treatment system, comprising:
- a vacuum header having a plurality of intake nozzles and at least one combustion chamber communicating with said plurality of intake nozzles;
- a vacuum system having a vacuum pump connected to said at least one combustion chamber;
- a scrubber system having at least one rotating chemical filtration element connected to said vacuum system; and
- a furnace system connected to said scrubber system.

8. The gas treatment system of claim 7 further comprising a combustion chamber outlet connecting said at least one combustion chamber to said vacuum pump, an auxiliary vacuum pump connected to said vacuum pump and a power line vacuum breaker connected to said auxiliary vacuum pump and said combustion chamber outlet.

9. The gas treatment system of claim 8 further comprising a vacuum outlet connecting said vacuum pump to said scrubber system, a manifold connected to said auxiliary vacuum pump and a main outlet connecting said manifold to said vacuum outlet.

10. The gas treatment system of claim 9 further comprising a chamber connected to said manifold and said power line vacuum breaker.

11. The gas treatment system of claim 8 further comprising a pump motor drivingly engaging said vacuum pump and said auxiliary vacuum pump.

12. The gas treatment system of claim 7 wherein said furnace system comprises a booster pump connected to said scrubber system and a boiler furnace connected to said booster pump.

13. The gas treatment system of claim 12 further comprising at least one chemical nozzle connected to said booster pump and extending into said boiler furnace.

14. The gas treatment system of claim 7 wherein said at least one combustion chamber comprises a first combustion chamber communicating with said plurality of intake nozzles, a second combustion chamber communicating with said first combustion chamber and a third combustion chamber communicating with said second combustion chamber.

15. A gas treatment system, comprising:
- a vacuum header;
- a vacuum system connected to said vacuum header;
- a scrubber system having at least one gas filtration tank connected to said vacuum system and at least one chemical filtration element provided in each of said at least one gas filtration tank;
- a furnace system connected to said scrubber system; and at least motor operably engaging said at least one chemical filtration element and adapted to rotate said at least one chemical filtration element in said at least one gas filtration tank.

16. The gas treatment system of claim 15 further comprising a holding tank connected to said vacuum system and at least one holding tank outlet connected to said holding tank, and wherein said at least one chemical filtration element communicates with said at least one holding tank outlet.

17. The gas treatment system of claim 16 further comprising an atomizer communicating with said at least one gas filtration tank and a bleed air line connected to said atomizer.

18. The gas treatment system of claim 17 further comprising a junction box connected to said atomizer, at least one filtration tank outlet connecting said at least one gas filtration tank to said junction box, a return line connecting said at least one holding tank outlet to said junction box and a return pump provided in said return line.

\* \* \* \* \*